(12) United States Patent
Trail et al.

(10) Patent No.: US 11,102,467 B2
(45) Date of Patent: Aug. 24, 2021

(54) ARRAY DETECTOR FOR DEPTH MAPPING

(71) Applicant: Facebook Technologies, LLC, Menlo Park, CA (US)

(72) Inventors: Nicholas Daniel Trail, Bothell, WA (US); Renzo De Nardi, Seattle, WA (US); Richard Andrew Newcombe, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 49 days.

(21) Appl. No.: 15/247,727

(22) Filed: Aug. 25, 2016

(65) Prior Publication Data

US 2018/0063508 A1 Mar. 1, 2018

(51) Int. Cl.
| | |
|---|---|
| *G06T 19/00* | (2011.01) |
| *H04N 13/254* | (2018.01) |
| *H04N 13/271* | (2018.01) |
| *H04N 13/332* | (2018.01) |

(Continued)

(52) U.S. Cl.
CPC ....... *H04N 13/254* (2018.05); *G02B 27/0172* (2013.01); *G06T 19/006* (2013.01); *H04N 13/243* (2018.05); *H04N 13/271* (2018.05); *H04N 13/332* (2018.05); *G02B 2027/0138* (2013.01)

(58) Field of Classification Search
CPC ........ G02B 2027/0138; G02B 27/0172; G06T 19/006
See application file for complete search history.

(56) References Cited

U.S. PATENT DOCUMENTS

| | | | |
|---|---|---|---|
| 2006/0054782 A1* | 3/2006 | Olsen | ................ H01L 31/02325 |
| | | | 250/208.1 |
| 2007/0064976 A1* | 3/2007 | England | ................... G01C 3/08 |
| | | | 382/106 |

(Continued)

FOREIGN PATENT DOCUMENTS

| | | |
|---|---|---|
| CN | 102197639 A | 9/2011 |
| CN | 102439979 A | 5/2012 |

(Continued)

OTHER PUBLICATIONS

PCT International Search Report and Written Opinion, PCT Application No. PCT/US2017/016551, dated Jun. 12, 2017, 19 pages.

(Continued)

*Primary Examiner* — M D N Haque
(74) *Attorney, Agent, or Firm* — Fenwick & West LLP

(57) ABSTRACT

A depth camera assembly (DCA) captures data describing depth information in a local area. The DCA includes an array detector, a controller, and an illumination source. The array detector includes a detector that is overlaid with a lens array. The detector includes a plurality of pixels, the plurality of pixels are divided into a plurality of different pixel groups. The lens array includes a plurality of lens stacks and each lens stack overlays a different pixel group. The array detector captures one or more composite images of the local area illuminated with the light from the illumination source. The controller determines depth information for objects in the local area using the one or more composite images.

21 Claims, 4 Drawing Sheets

(51) Int. Cl.
*G02B 27/01* (2006.01)
*H04N 13/243* (2018.01)

(56) References Cited

U.S. PATENT DOCUMENTS

| | | | | |
|---|---|---|---|---|
| 2010/0128137 | A1* | 5/2010 | Guidash | H04N 5/2355 348/222.1 |
| 2010/0309201 | A1* | 12/2010 | Lim | G06T 5/002 345/419 |
| 2013/0050432 | A1* | 2/2013 | Perez | G06F 3/017 348/47 |
| 2013/0194389 | A1 | 8/2013 | Vaught et al. | |
| 2014/0198017 | A1 | 7/2014 | Lamb et al. | |
| 2014/0240464 | A1 | 8/2014 | Lee | |
| 2014/0267243 | A1 | 9/2014 | Venkataraman et al. | |
| 2015/0122411 | A1 | 5/2015 | Rodda et al. | |
| 2015/0268450 | A1* | 9/2015 | Ueno | G02B 3/0056 348/360 |
| 2015/0279102 | A1 | 10/2015 | Fleck et al. | |
| 2016/0216760 | A1 | 7/2016 | Trutna et al. | |
| 2018/0139431 | A1* | 5/2018 | Simek | H04N 5/2258 |

FOREIGN PATENT DOCUMENTS

| | | |
|---|---|---|
| CN | 104469147 A | 3/2015 |
| CN | 104935790 A | 9/2015 |
| JP | 2015125641 A | 7/2015 |
| JP | 2015-536514 A | 12/2015 |
| WO | WO 2009/125577 A1 | 10/2009 |
| WO | WO 2015/074078 A1 | 5/2015 |
| WO | WO 2015/097284 A1 | 7/2015 |
| WO | WO 2015/192117 A1 | 12/2015 |

OTHER PUBLICATIONS

European Extended Search Report, European Application No. 17157886.7, dated Oct. 10, 2017, 9 pages.
National Intellectual Property Administration, Office Action, Chinese Patent Application No. 201780051832.8, dated Mar. 17, 2020, 12 pages (with Concise Explanation of Relevance).
The Japan Patent Office, Office Action, Japanese Patent Application No. 2019-510907, dated Dec. 22, 2020, 10 pages.

* cited by examiner

ARRAY DETECTOR FOR DEPTH MAPPING

BACKGROUND

The present disclosure generally relates to virtual or augmented reality systems and more specifically relates to an array detector that obtains information used to determine depth information of a local area.

Virtual reality (VR), augmented reality (AR), and mixed reality (MR) systems can leverage the capture of the environment surrounding a user in three dimensions (3D). However, traditional depth camera imaging architectures are comparably large in size, heavy, and consume significant amounts of power. Example depth camera imaging architectures for obtaining 3D information of a scene include e.g., stereo vision, time-of-flight (ToF), and structured light (SL). Different depth camera imaging architectures provide different strengths and weaknesses, so certain depth camera imaging architectures may provide better performance than others in different operating conditions. For instance, stereo vision architectures operate well with ambient illumination, while ToF architectures having an active illumination source may be impaired by limitations in signal-to-noise ratio from ambient illumination. However, because of the relatively large size of conventional depth camera imaging architectures, many systems including a depth camera typically use a single type of depth camera imaging architecture configured for a particular use case. As head-mounted systems are increasingly used to perform a broader range of functions in varied operating conditions and environments, selecting a single depth camera imaging architecture to obtain depth information of an area surrounding the head-mounted system and user may impair the user experience with head-mounted systems. In addition, as HMDs become more prevalent for both indoor and outdoor usage, the dynamics of the operating environment could benefit from a higher degree of reliability and resiliency in the captured data quality.

SUMMARY

A depth camera assembly (DCA) that captures data describing depth information in a local area surrounding, e.g., a head-mounted display (HMD) that includes the DCA. The DCA includes an array detector, a controller, and an illumination source. The array detector includes a detector and a portion of the detector is overlaid with a lens array. The detector includes a plurality of pixels, the plurality of pixels are divided into a plurality of different pixel groups. The lens array includes a plurality of lens stacks and each lens stack overlays a different pixel group. The array detector captures one or more composite images of the local area illuminated with the light from the illumination source. The controller determines depth information for objects in the local area using the one or more composite images. In embodiments, where the DCA is part of a HMD, an electronic display element displays a virtual object based in part on the depth information. And an optics block directs light from the electronic display element to an exit pupil of the HMD.

A lens stack is one or more optical elements that focus light from the local area onto a corresponding portion of the active region. Each lens stack may be identical or different from other lens stacks in the lens array. For example, one or more optical elements of a lens stack may be varied such that one or more of focal length, f-number, aperture, wavelength of transmission, polarization, etc., may differ between lens stacks in the same lens array. Each lens stack overlays a different portion of an active region of the detector that corresponds to a respective pixel group, to form a camera unit. Accordingly, a single detector and a multiple lens stacks create multiple camera units. Output from the detector includes content from each of the camera units that together form a composite image of the local area. The composite image may be used by, e.g., a controller and/or a virtual reality console to determine depth information for the local area via a variety of techniques including, e.g., stereo vision, photometric stereo, structured light (SL), time-of-flight (ToF), or some combination thereof.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
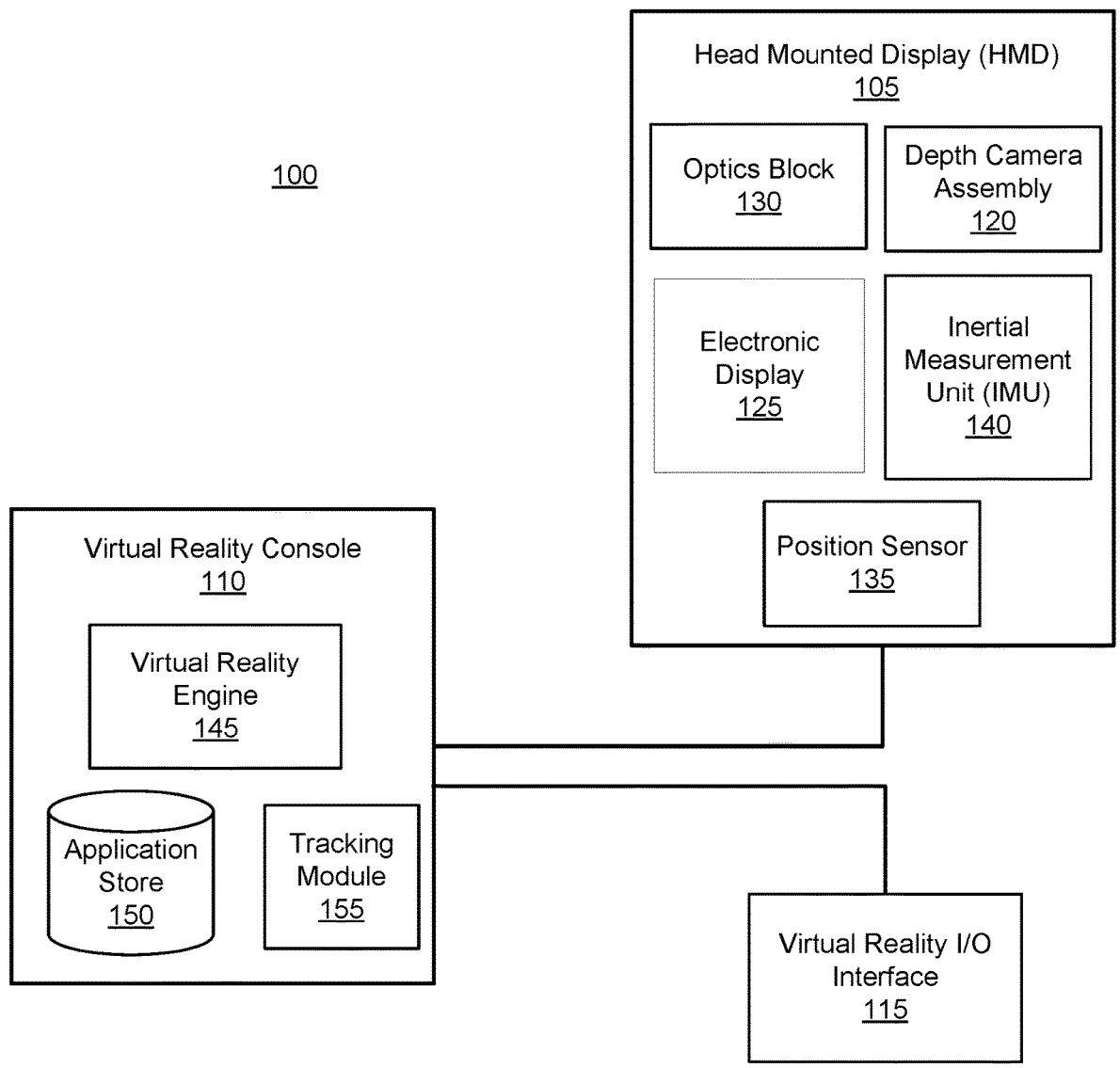
FIG. 1 is a block diagram of a system environment including a virtual reality system, in accordance with an embodiment.

FIG. 1 is a block diagram of one embodiment of a virtual reality (VR) system environment 100 in which a VR console 110 operates. While FIG. 1 shows a VR system environment for purposes of illustration, the components and functionality described herein may also be included in an augmented reality (AR) system or a mixed reality (MR) system in various embodiments. As used herein, a VR system environment 100 may also include virtual reality system environments that present users with virtual environments with which the user may interact. The VR system environment 100 shown by FIG. 1 comprises a head mounted display (HMD) 105 and a VR input/output (I/O) interface 115 that is coupled to a VR console 110. While FIG. 1 shows an example system 100 including one HMD 105 and one VR I/O interface 115, in other embodiments any number of these components may be included in the VR system environment 100. For example, there may be multiple HMDs 105 each having an associated VR I/O interface 115, with each HMD 105 and VR I/O interface 115 communicating with the VR console 110. In alternative configurations, different and/or additional components may be included in the VR system environment 100. Additionally, functionality described in conjunction with one or more of the components shown in FIG. 1 may be distributed among the components in a different manner than described in conjunction with FIG. 1 in some embodiments. For example, some or all of the functionality of the VR console 110 is provided by the HMD 105.

The HMD 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 105, the VR console 110, or both, and presents audio data based on the audio information. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The HMD 105 includes a depth camera assembly (DCA) 120, an electronic display 125, an optics block 130, one or more position sensors 135, and an inertial measurement Unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments, or be captured in separate assemblies remote from the HMD 105.

The DCA 120 captures data describing depth information of an area surrounding the HMD 105. The data describing depth information may be associated with one or a combination of the following techniques used to determine depth information: stereo vision, photometric stereo, structured light (SL), and time-of-flight (ToF). The DCA 120 can compute the depth information using the data, or the DCA 120 can send this information to another device such as the VR console 110 that can determine the depth information using data from the DCA 120.

In one embodiment, the DCA 120 includes an illumination source, an array detector, and a controller. The illumination source emits light onto an area surrounding the HMD. The array detector captures ambient light and light from the illumination source that is reflected from objects in the area. The array detector includes a lens array that divides an active area of the array detector into multiple regions (e.g., the lens array may include 4 separate lens stacks), and each region provides a different viewpoint of the local area. The array detector is configured to provide data on multiple views of the local area for better extraction of depth information. The controller coordinates how the illumination source emits light and how the array detector captures light. Additional detail regarding operation of the DCA 120 is discussed below with regard to FIG. 3.

The electronic display 125 displays 2D or 3D images to the user in accordance with data received from the VR console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the HMD 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as partially reflective or anti-reflective coatings.

Magnification and focusing of the image light by the optics block 130 allows the electronic display 125 to be physically smaller, weigh less, and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the VR console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the VR console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The VR I/O interface 115 is a device that allows a user to send action requests and receive responses from the VR console 110. An action request is a request to perform a particular action. For example, an action request may be an instruction to start or end capture of image or video data, or an instruction to perform a particular action within an application. The VR I/O interface 115 may include one or more input devices. Example input devices include: a keyboard, a mouse, a game controller, or any other suitable device for receiving action requests and communicating the action requests to the VR console 110. An action request received by the VR I/O interface 115 is communicated to the VR console 110, which performs an action corresponding to the action request. In some embodiments, the VR I/O interface 115 includes an IMU 140, as further described above, that captures calibration data indicating an estimated position of the VR I/O interface 115 relative to an initial position of the VR I/O interface 115. In some embodiments, the VR I/O interface 115 may provide haptic feedback to the user in accordance with instructions received from the VR console 110. For example, haptic feedback is provided when an action request is received, or the VR console 110 communicates instructions to the VR I/O interface 115 causing the VR I/O interface 115 to generate haptic feedback when the VR console 110 performs an action.

The VR console 110 provides content to the HMD 105 for processing in accordance with information received from one or more of: the DCA 120, the HMD 105, and the VR I/O interface 115. In the example shown in FIG. 1, the VR console 110 includes an application store 150, a tracking module 155 and a VR engine 145. Some embodiments of the VR console 110 have different modules or components than those described in conjunction with FIG. 1. Similarly, the functions further described below may be distributed among components of the VR console 110 in a different manner than described in conjunction with FIG. 1.

The application store 150 stores one or more applications for execution by the VR console 110. An application is a group of instructions, that when executed by a processor, generates content for presentation to the user. Content generated by an application may be in response to inputs received from the user via movement of the HMD 105 or the VR I/O interface 115. Examples of applications include: gaming applications, conferencing applications, video playback applications, or other suitable applications.

The tracking module 155 calibrates the VR system environment 100 using one or more calibration parameters and may adjust one or more calibration parameters to reduce error in determination of the position of the HMD 105 or of the VR I/O interface 115. For example, the tracking module 155 communicates a calibration parameter to the DCA 120 to adjust the focus of the DCA 120 to more accurately determine positions of SL elements captured by the DCA 120. Calibration performed by the tracking module 155 also accounts for information received from the IMU 140 in the HMD 105 and/or an IMU 140 included in the VR I/O interface 115. Additionally, if tracking of the HMD 105 is lost (e.g., the DCA 120 loses line of sight of at least a threshold number of SL elements), the tracking module 140 may re-calibrate some or all of the VR system environment 100.

The tracking module 155 tracks movements of the HMD 105 or of the VR I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the VR I/O interface 115 using data indicating a position of the HMD 105 from the IMU 140 or using data indicating a position of the VR I/O interface 115 from an IMU 140 included in the VR I/O interface 115, respectively. Additionally, in some embodiments, the tracking module 155 may use portions of data indicating a position or the HMD 105 from the IMU 140 as well as representations of the local area from the DCA 120 to predict a future location of the HMD 105. The tracking module 155 provides the estimated or predicted future position of the HMD 105 or the VR I/O interface 115 to the VR engine 145.

The VR engine 145 generates a 3D mapping of the area surrounding the HMD 105 (i.e., the "local area") based on information received from the HMD 105. In some embodiments, the VR engine 145 determines depth information for the 3D mapping of the local area based on information received from the DCA 120 that is relevant for techniques used in computing depth. The VR engine 145 may calculate depth information using one or more techniques in computing depth (e.g., stereo vision, photometric stereo, SL, ToF, or some combination thereof). In various embodiments, the VR engine 145 uses different types of information determined by the DCA 120 or a combination of types of information determined by the DCA 120.

The VR engine 145 also executes applications within the VR system environment 100 and receives position information, acceleration information, velocity information, predicted future positions, or some combination thereof, of the HMD 105 from the tracking module 155. Based on the received information, the VR engine 145 determines content to provide to the HMD 105 for presentation to the user. For example, if the received information indicates that the user has looked to the left, the VR engine 145 generates content for the HMD 105 that mirrors the user's movement in a virtual environment or in an environment augmenting the local area with additional content. Additionally, the VR engine 145 performs an action within an application executing on the VR console 110 in response to an action request received from the VR I/O interface 115 and provides feedback to the user that the action was performed. The provided feedback may be visual or audible feedback via the HMD 105 or haptic feedback via the VR I/O interface 115.

Figure 2:
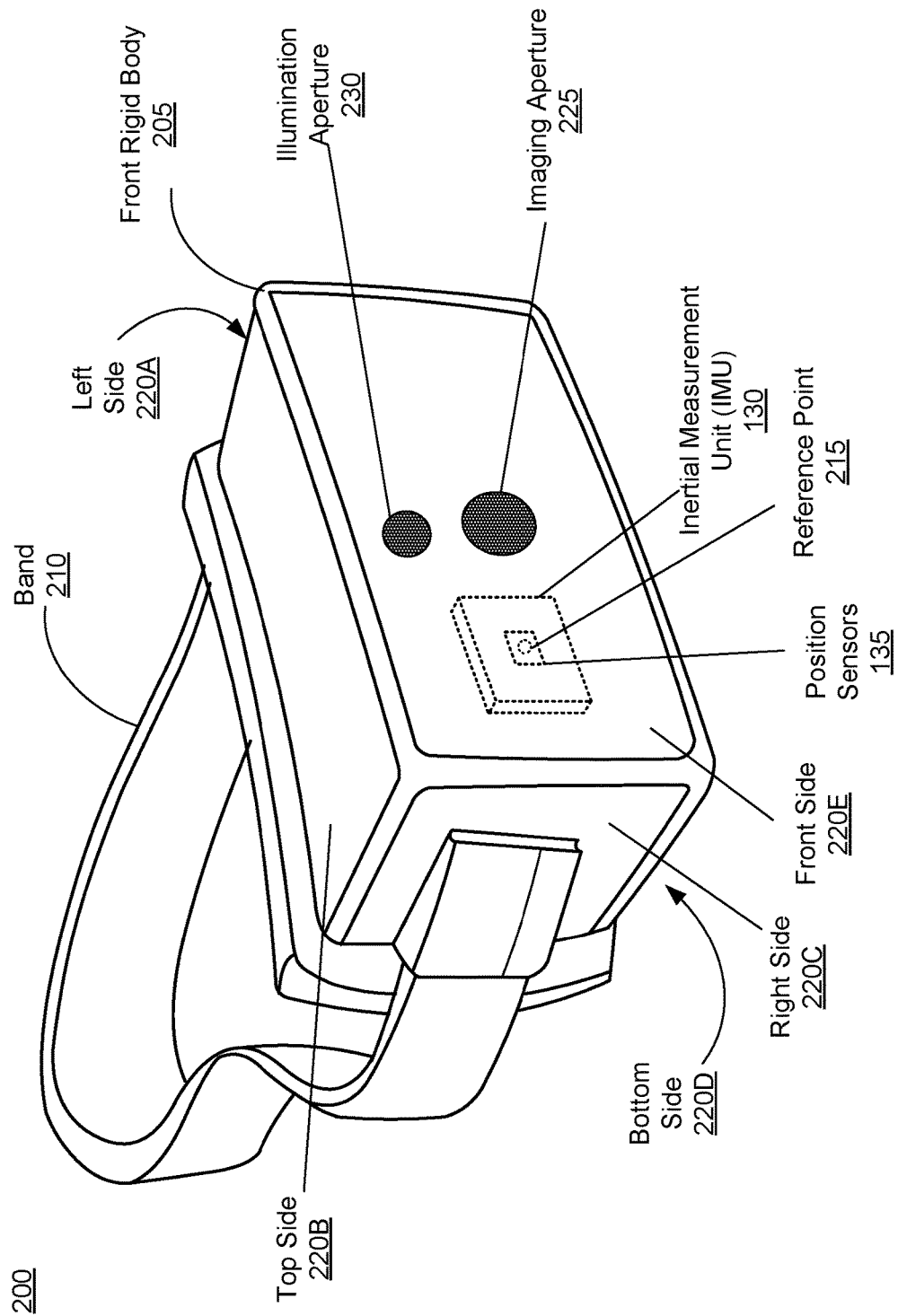
FIG. 2 is a diagram of a head-mounted display, in accordance with an embodiment.

FIG. 2 is a wire diagram of one embodiment of a HMD 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of a depth camera assembly (DCA) 120 and depicts an imaging aperture 225 and an illumination aperture 230. Some embodiments of the DCA 120 include an array detector, and an illumination source. The illumination source emits light through an illumination aperture 230. The array detector captures light from the illumination source and ambient light in the local area through an imaging aperture 225. The front rigid body 205 includes one or more electronic display elements of the electronic display 125 (not shown), the IMU 130, the one or more position sensors 135, and the reference point 215.

Figure 3:
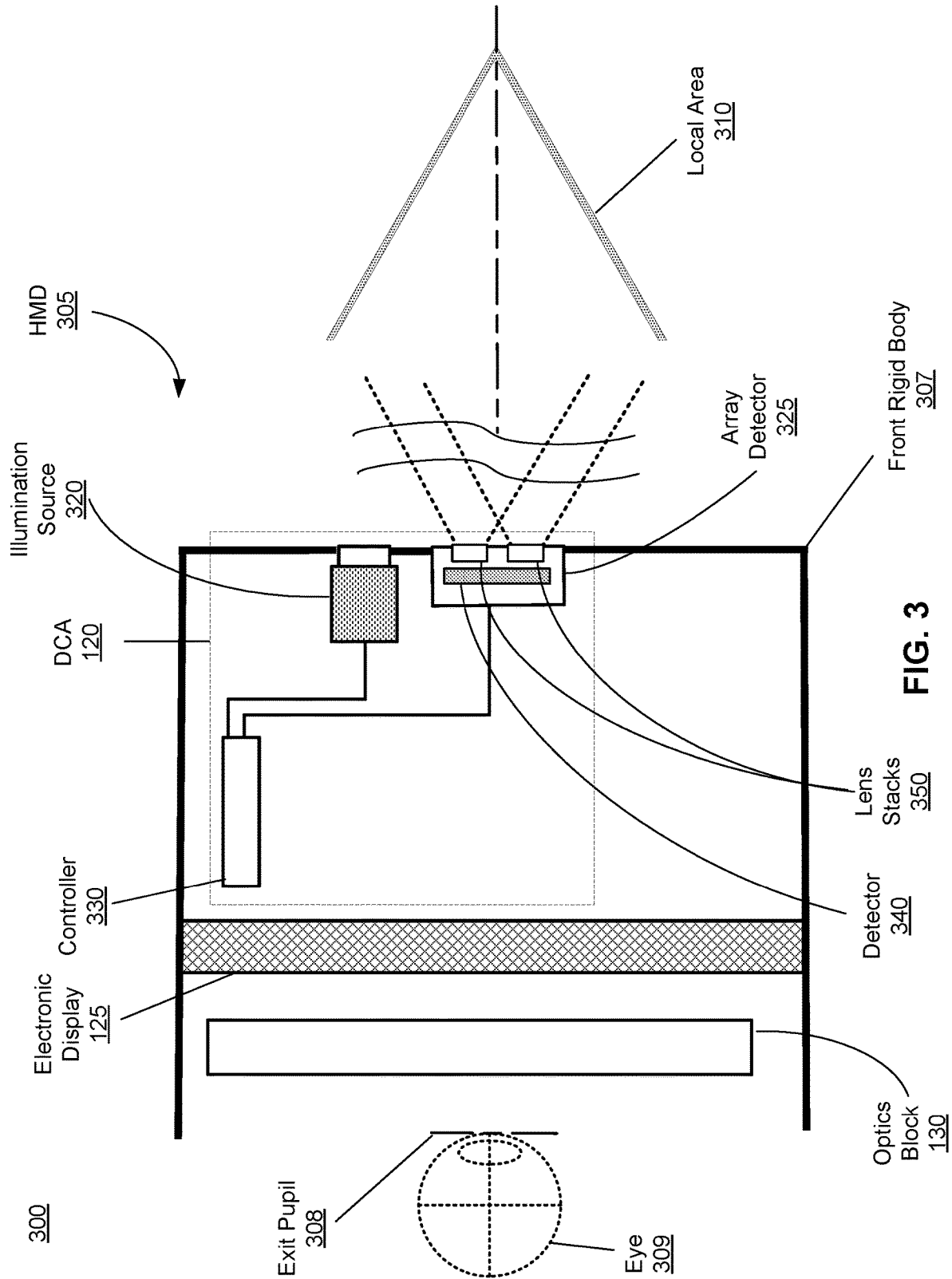
FIG. 3 is a cross section of a front rigid body of a head-mounted display, including a depth camera assembly in accordance with an embodiment.

FIG. 3 is a cross section 300 of an HMD 305, in accordance with an embodiment. In some embodiments, the HMD 305 is an embodiment of the HMD 105. In other embodiments it is part of some other HMD. The front rigid body 307 includes a depth camera assembly (DCA) 120, an electronic display 125, and an optics block 130. Some embodiments of the HMD 305 have different components than those described here. Similarly, in some cases, functions can be distributed among the components in a different manner than is described here. The front rigid body 307 also includes an exit pupil 308 where an eye 309 of a user would be located. For purposes of illustration, FIG. 3 shows a cross section of the front rigid body 307 in accordance with a single eye 309. Although FIG. 3 depicts a center cross-section of the eye 309 as being in the same plane as the DCA 120, the center cross-section of the eye 309 and the DCA 120 do not have to be in the same plane. Additionally, another electronic display 125 and optics block 130, separate from those shown in FIG. 3, may be included in the front rigid body 307 to present content, such as an augmented representation of the local area 310 or virtual content, to another eye of the user.

The depth camera assembly (DCA) 120 includes an illumination source 320, an array detector 325, and a controller 330. In alternate embodiments, the DCA 120 does not include an illumination source 320, and relies on ambient light on the local area 310 for data.

The illumination source 320 illuminates the local area 310 with light. The illumination source 320 includes one or more emitters that emit light onto the local area 310. The local area 310 is an area surrounding the HMD 105 and includes objects in a field of view of the array detector 325. The one or more emitters of the illumination source 320 may emit the same spectrum of light, or each emitter may emit a different spectrum or particular range of wavelengths of light (i.e., "bands" of light). Example bands of light emitted by the illumination source 320 include: a visible band (~380 nm to 750 nm), an infrared (IR) band (~750 nm to 2,200 nm), an ultraviolet band (100 nm to 380 nm), another portion of the electromagnetic spectrum, or some combination thereof. The illumination source 320 may emit SL with a specified pattern, such as a symmetric or quasi-random dot pattern, grid, or horizontal bars. Embodiments of an illumination source with multiple emitters and its integration into a HMD is further described in U.S. application Ser. No. 15/232,073, filed on Aug. 9, 2016, which is hereby incorporated by reference in its entirety.

The array detector 325 captures images of the local area 310. The array detector 325 includes a detector 340 and a lens stacks 350. The detector 340 is made of a single sensor, however, in alternate embodiments is made of two or more sensors. In some embodiments the detector 340 is a single sensor and the system can leverage the inherent lithographic and semiconductor fabrication precision between pixel groups. In addition, the detector 340 can be mounted on a common, monolithic mount with overall dimensions on the order of millimeters, which helps desensitize the system to environmental effects (e.g. introducing errors in calibration due to temperature, vibration, or shock).

The detector 340 may capture and record particular bands of light or specific polarizations of light. For example, the detector 340 may capture images including light in the visible band and in the infrared band. The detector 340 may capture images including light of specific polarizations (e.g. circularly, linearly polarized light).

The detector 340 is made of an active region and inactive region. The active region of the detector 340 is an area of the detector including a plurality of pixels which responds to light. Light incident on pixels in the active region of the detector 340 can contribute to the light measured by the detector 340. Inactive regions of the detector 340 do not respond to light. Light incident on inactive regions of the detector 340 do not contribute to the light measured by the detector 340. For example, the detector 340 may include areas in between pixels or at the periphery of the plurality of pixels, which do not contribute to the light measured by the detector 340.

In one embodiment, the detector 340 is a single sensor composed of a plurality of pixels. The plurality of pixels is divided up into two or more different pixel groups. Each pixel group may have the same number of pixels or a different number of pixels. In some embodiments, the pixel groups may be the same size. For example, a detector 340 may have 2000×2000 pixels, and be divided into 4 different pixel groups that are each 1000×1000 pixels. In other embodiments, one or more of the pixel groups are of different sizes (e.g., continuing with the above example, the detector may be divided into 10 different pixel groups that may include two 1000×1000 pixels, and eight 500×500 pixels).

The lens array 350 is made of a plurality of lens stacks. A lens stack is made of one or more optical elements. A lens stack may include, e.g., one or more lenses, a reflecting surface, a diffractive element, a wavelength filter, a polarizer, an aperture, or some combination thereof. The optical elements in a lens stack may be configured for specific focal length, f-number, aperture, wavelength of transmission, and polarization of transmission of the lens stack. For example, a lens stack may comprise of a polarization filter to filter light for a specific polarization, a bandpass filter to filter light for a specific band of light, etc.

The lens stacks in the lens array 350 can be the same or different to other lens stacks in the lens array 350. Each lens stack overlays a different portion of an active region of the detector 340, corresponding to a pixel group of the detector 340, to form a camera unit. As a lens stack's optical characteristics are in part determined by its optical components, a corresponding camera unit can also have different properties (e.g., focal length, f-number, aperture, wavelength, polarization state, etc.) than other camera units in the array detector 325. Each camera unit of the array detector 325 can record an image of the local area 310. Each camera unit may have partially overlapping and partially different field of view coverage, to allow both a region of the field of view with a multiple views as well as a method to increase the overall useful field of view being covered. In this manner, the region of the field of view that is overlapped by one or more camera units can allow higher data density and utilize stereo methods for retrieving depth information, and the field of view regions that are unique to each camera unit can utilize a sparser sampling approach and/or rely on asymmetric camera techniques for retrieving depth (e.g. SL and ToF). In this manner, it is possible to increase the data density for the portion of the field that is considered "higher priority" while also considering the overall field of view coverage. One or more composite images of the local area 310 can be made using the images from individual camera units. A composite image is a single image that includes information from different camera units.

The controller 330 is configured to determine depth information for objects in the local area 310 using the one or more composite images. The controller 330 controls how light is emitted from the illumination source 320 and how the array detector 325 captures light. For example, the controller 330 can instruct one or more emitters in the illumination source 320 to emit light. In this manner, the controller 330 can control the timing of the illumination source 320. The controller 330 can also control the timing of when data is collected from one or more camera units of the array detector. Thus, the controller 330 can coordinate the capturing of data of one or more camera units of the array detector 325 with light emission by the illumination source 320, or through ambient sources.

The controller 330 is configured to capture depth information based in part on the technique employed for capturing depth information. For example, the depth information could be determined by using one or a combination of the following techniques: stereo vision, photometric stereo, SL, and ToF.

The controller may also cause the DCA 120 to capture depth information using a stereo vision technique. In one embodiment, the controller 330 controls two or more camera units from the array detector 325 to capture light reflected off of the local area 310. Since the camera units of the array detector 325 are located a fixed distance apart from each other, two or more camera units can be used to extract depth information. Each camera unit collects light that is reflected from the local area 310 (e.g., one or more objects in the local area 310). In an alternative embodiment, the controller 330 coordinates the emitting of light from the illumination source 320 with the collection of light from two or more camera units of the array detector 325. The data collected by the controller 330, which contains data from different vantage points, can be compared to determine depth information.

The controller 330 may also cause the DCA 120 to capture depth information using a photometric stereo technique. In one embodiment, the controller 330 coordinates the emitting of light from two or more emitters of the illumination source 320 with the collection of light from one or more camera unit of the array detector 325. The data collected by the controller 330, which includes data with different lighting conditions, can be used to determine depth of objects in the local area 310.

The controller 330 may also cause the DCA 120 to capture depth information using a SL technique. In one embodiment, the controller 330 controls an illumination source 320 to emit SL with a specific pattern onto the local area 310. The controller 330 coordinates the emitting of the SL from the illumination source 320 with the collection of light from one or more camera units in the array detector 325. The data collected by the controller 330, which includes SL information, can be used to determine depth of objects in the local area 310.

The controller 330 may also cause the DCA 120 to capture depth information using a ToF technique. In one embodiment, the controller 330 controls when light is emitted from the illumination source 320, and measures the time (temporal phase) it takes for the emitted light to be reflected from of the local area 310 and detected by one or more cameras of the array detector 325. The data collected by the controller 330, which includes ToF information, can be used to determine depth of objects in the local area 310.

The controller 330 may also cause the DCA 120 to capture ToF information simultaneously or near-simultaneously with SL information. The controller 330 modulates the illumination source 320 which emits SL with a carrier signal having a specific frequency, such as 10 MHz, to capture ToF information as well as SL information. In various embodiments, the controller 330 activates different camera units of the array detector 325 at different times relative to each other to capture different temporal phases of the SL modulated by the carrier signal emitted by the illumination source 320. For example, camera units are activated at different times so that adjacent camera units capture light having approximately a 90, 180, or 270 degree phase shift relative to each other. The controller 330 collects data from individual camera units which can be used to derive the phase of the carrier signal for ToF information. The data collected by the controller 330 includes both SL and ToF information can be used to determine depth of objects in the local area 310.

Figure 4:
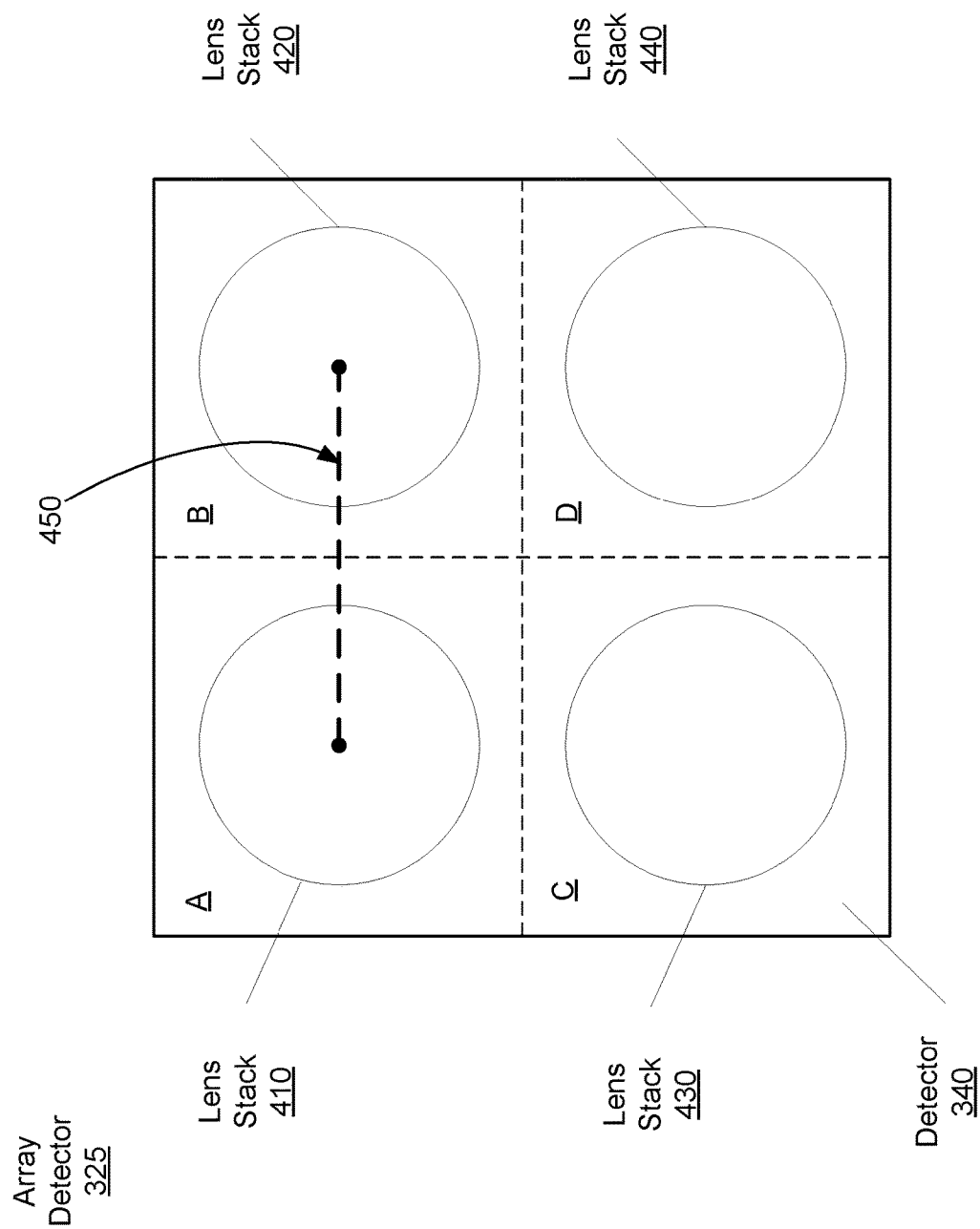
FIG. 4 is a top view of an array detector of a depth camera assembly, in accordance with an embodiment.

FIG. 4 shows a top view of the array detector 325 of FIG. 3, according to an embodiment. The lens stacks 350 is a 2×2 array of four lens stacks, specifically lens stack 410, lens stack 420, lens stack 430, and lens stack 440. Adjacent lens stacks have center-to-center spacing on the order of 2 to 20 millimeters. For example, lens stack 410 and lens stack 420 have center-to-center spacing 450 in FIG. 4. In this embodiment, each lens stack covers approximately a quarter area of the detector 340 that is split into a 2×2 array of pixel groups of the same number of pixels: A, B, C, and D. For example if the array detector 325 has 2000×2000 pixels, each pixel group is 1000×1000 pixels. Each pixel group is overlaid with an associated lens stack. For example, pixel group A is overlaid with the lens stack 410, pixel group B is overlaid with the lens stack 420, pixel group C is overlaid with the lens stack 430, and pixel group D is overlaid with the lens stack 440.

In one embodiment, the pixel groups have approximately the same field of view coverage, and therefore it is possible to generate four views of the same local area. The four views are effectively correlated from the minor shifts in baseline due to the lens stacks spacing of 2 to 20 mm. Any single image capture can be improved since there are multiple correlated views of the same scene, illumination and time.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
  an illumination source configured to project light into a local area, wherein the projected light includes structured infrared light modulated with a carrier signal;
  an array detector comprising a detector including a plurality of pixels that are overlaid with a lens array including a plurality of lens stacks, the plurality of pixels divided into different pixel groups and each lens stack covering a different pixel group, wherein at least two different lens stacks are configured to transmit infrared light, the array detector configured to capture one or more composite images of the local area illuminated with the light from the illumination source, each composite image being a single image captured from the detector, the single image comprising a plurality of images, and each image of the plurality of images captured from a corresponding pixel group that is covered by a corresponding lens stack; and a controller configured to:
  derive a phase of the carrier signal based in part on the plurality of images; and
  determine depth information for objects in the local area by: (i) applying a time of flight depth measurement technique to the one or more composite images based in part on the derived phase of the carrier signal, and (ii) applying a structured light depth measurement technique to the one or more composite images,
  wherein each respective pixel group and corresponding lens stack form a respective camera unit, and a first camera unit has a first field of view and a second camera unit has a second field of view, and the first field of view and the second field of view overlap over a first overlapped region, and the controller is configured to determine depth information for the overlapped region via stereo methods, and for portions of the first field of view and the second field of view that do not overlap with each other or other fields of view determine depth information using at least one of the time of flight depth measurement technique and the structured light depth measurement technique.

2. The DCA of claim 1, wherein the DCA is part of a head-mounted display (HMD) comprising:
  an electronic display element configured to display a virtual object based in part on the depth information; and
  an optics block configured to direct light from the electronic display element to an exit pupil of the HMD.

3. The DCA of claim 1, wherein each pixel group includes a same number of pixels.

4. The DCA of claim 1, wherein at least one pixel group has a different number of pixels than another pixel group of the plurality of pixels.

5. The DCA of claim 1, wherein the lens array comprises four lens stacks, and each corresponding pixel group has a same number of pixels.

6. The DCA of claim 1, wherein a lens stack of the plurality of lens stacks comprises one or more optical elements selected from a group consisting of: a lens, a diffractive element, a wavelength filter, a polarizer, an aperture, or some combination thereof.

7. The DCA of claim 6, wherein at least one of the lens stacks in the lens array includes at least one different optical element than another lens stack in the lens array.

8. The DCA of claim 7, wherein each lens stacks in the lens array include a same one or more optical elements.

9. A depth camera assembly (DCA) comprising:
  an illumination source configured to project light into a local area, wherein the projected light includes structured infrared light modulated with a carrier signal;
  an array detector comprising a detector including a plurality of pixels that are overlaid with a lens array including a plurality of lens stacks, the plurality of pixels divided into different pixel groups and each lens stack covering a different pixel group, wherein at least two different lens stacks are configured to transmit infrared light, the array detector configured to capture one or more composite images of the local area illuminated with the light from the illumination source, each composite image being a single image captured from the detector, the single image comprising a plurality of images, and each image of the plurality of images captured from a corresponding pixel group that is covered by a corresponding lens stack; and a controller configured to provide the one or more composite images to a virtual reality (VR) console, wherein the VR console is configured to derive a phase of the carrier signal based in part on the plurality of images, determine depth information by: (i) applying a time of flight depth measurement technique to the one or more composite images based in part on the derived phase of the carrier signal, and (ii) applying a structured light depth measurement technique to the one or more composite images, and generate a virtual object based in part on the depth information,
  wherein each respective pixel group and corresponding lens stack form a respective camera unit, and a first camera unit has a first field of view and a second camera unit has a second field of view, and the first field of view and the second field of view overlap over a first overlapped region, and the controller is configured to determine depth information for the overlapped region via stereo methods, and for portions of the first field of view and the second field of view that do not overlap with each other or other fields of view determine depth information using at least one of the time of flight depth measurement technique and the structured light depth measurement technique.

10. The DCA of claim 9, wherein each pixel group includes a same number of pixels.

11. The DCA of claim 9, wherein at least one pixel group has a different number of pixels than another pixel group of the plurality of pixels.

12. The DCA of claim 9, wherein the lens array comprises four lens stacks, and each corresponding pixel group has a same number of pixels.

13. The DCA of claim 9, wherein a lens stack of the plurality of lens stacks comprises one or more optical elements selected from a group consisting of: a diffractive element, a wavelength filter, a polarizer, an aperture, or some combination thereof.

14. The DCA of claim 13, wherein at least one of the lens stacks in the lens array includes at least one different optical element than another lens stack in the lens array.

15. A depth camera assembly (DCA) comprising:
an illumination source to project light into a local area, wherein the projected light includes structured infrared light modulated with a carrier signal;
an array detector comprising:
a first detector including a first group of pixels;
a second detector located adjacent to the first detector, the second detector including a second group of pixels,
a lens array including a first lens stack and a second lens stack, the first lens stack overlaying the first group of pixels, and the second lens stack overlaying the second group of pixels, wherein the first lens stack and the second lens stack are configured to transmit infrared light, and
wherein a first image captured of the local area by the first detector over a particular range of time and a second image captured of the local area by the second detector over the particular range of time together make up a composite image, the composite image being a single image captured from the first detector and the second detector; and
a controller configured to derive a phase of the carrier signal based in part on the first and second images and determine depth information for objects in the local area by: (i) applying a time of flight depth measurement technique to the composite image based in part on the derived phase of the carrier signal, and (ii) applying a structured light depth measurement technique to the composite image,
wherein each respective pixel group and corresponding lens stack form a respective camera unit, and a first camera unit has a first field of view and a second camera unit has a second field of view, and the first field of view and the second field of view overlap over a first overlapped region, and the controller is configured to determine depth information for the overlapped region via stereo methods, and for portions of the first field of view and the second field of view that do not overlap with each other or other fields of view determine depth information using at least one of the time of flight depth measurement technique and the structured light depth measurement technique.

16. The DCA of claim 15, wherein the first group of pixels and the second group of pixels include a same number of pixels.

17. The DCA of claim 15, wherein the first group of pixels has a different number of pixels than the second group of pixels.

18. The DCA of claim 15, wherein the first lens stack and the second lens stack comprise one or more optical elements selected from a group consisting of: a diffractive element, a wavelength filter, a polarizer, an aperture, or some combination thereof.

19. The DCA of claim 18, wherein the first lens stack includes at least one different optical element than the second lens stack.

20. The DCA of claim 1, wherein the controller is configured to determine depth information for objects in the local area by: (i) applying the time of flight depth measurement technique to a first image portion of the one or more composite images captured from the detector corresponding to a first pixel group based in part on the derived phase of the carrier signal, and (ii) applying the structured light depth measurement technique to a second image portion of the one or more composite images captured from the detector corresponding to a second pixel group.

21. The DCA of claim 1, wherein the controller determines the depth information for the first field of view and the second field of view using a single composite image of the one or more composite images.

* * * * *